United States Patent
Arimoto et al.

(10) Patent No.: US 7,960,923 B2
(45) Date of Patent: Jun. 14, 2011

(54) HIGH PRESSURE DISCHARGE LAMP LIGHTING APPARATUS

(75) Inventors: Tomoyoshi Arimoto, Hyogo (JP); Takashi Yamashita, Hyogo (JP); Tetsuji Hirao, Hyogo (JP); Tetsu Okamoto, Hyogo (JP); Kentaro Fujita, Hyogo (JP)

(73) Assignee: Ushio Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 12/636,242

(22) Filed: Dec. 11, 2009

(65) Prior Publication Data
US 2010/0148686 A1 Jun. 17, 2010

(30) Foreign Application Priority Data
Dec. 11, 2008 (JP) ................. 2008-315220

(51) Int. Cl.
*G05F 1/00* (2006.01)
(52) U.S. Cl. ........ 315/307; 315/291; 315/224; 315/194; 315/247; 315/209 R
(58) Field of Classification Search ............ 315/209 R, 315/82, 246, 247, 289–291, 307, 308, 224, 315/360, 194, DIG. 5, DIG. 7; 313/491, 313/493, 633, 639, 641
See application file for complete search history.

(56) References Cited

U.S. PATENT DOCUMENTS

| 6,713,972 | B2 | 3/2004 | Nakagawa et al. | |
| 7,355,355 | B2* | 4/2008 | Okamoto | 315/291 |
| 7,443,110 | B2* | 10/2008 | Hotta et al. | 315/291 |
| 7,446,482 | B2* | 11/2008 | Sugaya | 315/200 R |

FOREIGN PATENT DOCUMENTS

| JP | 2002-175890 A | 6/2002 |
| JP | 2006-332015 A | 12/2006 |
| JP | 2007-213922 A | 8/2007 |
| JP | 2007-250236 A | 9/2007 |
| JP | 2008-192388 A | 8/2008 |

* cited by examiner

*Primary Examiner* — Haissa Philogene
(74) *Attorney, Agent, or Firm* — Rader, Fishman & Grauer PLLC

(57) ABSTRACT

A discharge lamp lighting apparatus includes a discharge container, a pair of electrodes and a power supply apparatus. An alternating current of a frequency, which is lower than stationary frequency, is inserted periodically into the alternating current of stationary frequency. When a lighting current value of the discharge lamp is smaller than a predetermined lower limit, the frequency is set as predetermined minimum frequency. When the lighting current value of a discharge lamp is larger than a predetermined maximum value, the frequency is set as predetermined maximum frequency. When a lighting current value of the discharge lamp is between the lower limit and the maximum value, the frequency is set as a selected frequency corresponding to the lighting current value. The selected frequency increases according to an increase of frequency change as a lighting current value increases.

8 Claims, 9 Drawing Sheets

| Lamp Current IL | Standard Frequency FH (Hz) | Low Frequency FL (Hz) | K=f0/f1 |
|---|---|---|---|
| IL < 2.0A | 74 | 24.67 | 3 |
| 2.0A ≦ IL < 2.1A | 74 | 24.67 | 3 |
| 2.1A ≦ IL < 2.2A | 148 | 29.6 | 5 |
| 2.2A ≦ IL < 2.3A | 370 | 46.25 | 8 |
| 2.3A ≦ IL < 2.4A | 740 | 74 | 10 |
| 2.4A ≦ IL < 2.5A | 740 | 123.33 | 6 |
| 2.5A ≦ IL < 2.6A | 740 | 185 | 4 |
| 2.6A ≦ IL | 740 | 370 | 2 |

FIG. 5

| Lamp Current IL | Standard Frequency FH (Hz) | Low Frequency FL (Hz) | K=f0/f1 |
|---|---|---|---|
| IL < 1.6A | 74 | 24.67 | 3 |
| 1.6A ≤ IL < 1.7A | 74 | 24.67 | 3 |
| 1.7A ≤ IL < 1.8A | 154.2 | 25.7 | 6 |
| 1.8A ≤ IL < 1.9A | 462.5 | 46.25 | 10 |
| 1.9A ≤ IL < 2.0A | 925 | 92.5 | 10 |
| 2.0A ≤ IL < 2.1A | 925 | 154.17 | 6 |
| 2.1A ≤ IL < 2.2A | 925 | 231.25 | 4 |
| 2.2A ≤ IL | 925 | 462.5 | 2 |

FIG. 6

| Lamp Current IL | Standard Frequency FH (Hz) | Low Frequency FL (Hz) | Frequency Spec No. | Accumulated lighting time 1000 - 2000h | Accumulated lighting time 2000 - 5000h | Accumulated lighting time 5000h |
|---|---|---|---|---|---|---|
| IL < 2.0A | 74 | 24.67 | 1 | 1 | 1 | 1 |
| 2.0A ≦ IL < 2.1A | 74 | 24.67 | 2 | 1 | 1 | 1 |
| 2.1A ≦ IL < 2.2A | 148 | 29.6 | 3 | 2 | 1 | 1 |
| 2.2A ≦ IL < 2.3A | 370 | 46.25 | 4 | 3 | 2 | 2 |
| 2.3A ≦ IL < 2.4A | 740 | 74 | 5 | 4 | 3 | 3 |
| 2.4A ≦ IL < 2.5A | 740 | 123.33 | 6 | 5 | 4 | 4 |
| 2.5A ≦ IL < 2.6A | 740 | 185 | 7 | 6 | 5 | 5 |
| 2.6A ≦ IL | 740 | 370 | 8 | 7 | 6 | 5 |

FIG. 8

HIGH PRESSURE DISCHARGE LAMP LIGHTING APPARATUS

CROSS-REFERENCES TO RELATED APPLICATION

This application claims priority from Japanese Patent Application Serial No. 2008-315220 filed Dec. 11, 2008, the contents of which are incorporated herein by reference in its entirety.

TECHNICAL FIELD

The present invention generally relates to a high pressure discharge lamp lighting apparatus. In particular, the present invention relates to a lamp lighting apparatus having an extra high pressure discharge lamp in which 0.20 mg/mm$^3$ of mercury is enclosed and the pressure thereof at time of lighting becomes 200 atmospheric pressure or more, and a power supply apparatus therefor.

BACKGROUND OF THE INVENTION

In general, there are two types of projector apparatuses: a system using a liquid crystal panel and a system using a DLP. In addition, in the system using a liquid crystal panel, there are one-sheet types and three-sheet types. In either system, radiation light from a light source is divided into three colors (RGB). In a liquid crystal panel transmission of light is adjusted according to image information in a liquid crystal panel, and the three colors which pass through the panel are synthesized so as to be projected on a screen. In the system using a DLP, there are also one-sheet types and three-sheet types. In the case of the one-sheet type, radiation light from a light source is irradiated in a time dividing manner, to a space modulation element (which is also referred to as a light modulation device, specifically, referred to as a DMD element etc.) through a rotation filter where RGB areas, which are separated from one another, are formed. This allows the DMD element to reflect the selected light irradating the screen. In such a DMD element, millions of small mirrors are arranged side by side, wherein projection of light is controlled by controlling direction of each small mirror.

A high pressure discharge lamp with a high mercury vapor pressure is used as a light source of a projector apparatus. This is because a high output of light in visible wavelength band is obtained by having a high mercury vapor pressure. Moreover, in this kind of discharge lamp, a projection(s) is formed at the tip of an electrode(s) during lighting. For example, in Japanese Patent Application Publication No. 2002-175890, existence of such a projection(s) is viewed as a problem. Further, '890 introduces technology that removes this projection, specifically, '890 inserts a low frequency (for example, 5 Hz) for 1 second or more in a stationary frequency, to completely eliminate the projection on an electrode surface.

SUMMARY OF THE INVENTION

However, even when the above described high pressure discharge lamp is used as a projector apparatus light source, an unstabilized arc luminescent spot causes a so-called 'flicker'. In particular, the flicker notably occurred in a discharge lamp enclosing 0.20 mg/mm$^3$ of mercury.

It is an object of the present invention to prevent flicker by stabilizing the position of an arc luminescent spot in an extra-high voltage discharge lamp enclosing 0.20 mg/mm$^3$ of mercury, and furthermore, to offer a lighting apparatus that even when lighting voltage or lighting electric power changes, the arc luminescent spot is stabilized regardless of this change.

In view of this problem, one aspect of the present invention is a high pressure discharge lamp lighting apparatus for lighting a discharge lamp, including: a discharge container made of quartz glass enclosing 0.20 mg/mm$^3$ or more of mercury and halogen in a range of $10^{-6}$ μmol/mm$^3$-$10^{-2}$ μmol/mm$^3$; a pair of electrodes arranged in the discharge container, wherein at a tip of each electrode, a projection is formed, so as to face each other at an interval of 2.0 mm or less; and a power supply apparatus that performs constant electric power control by supplying alternating current of stationary frequency, which is selected from a range of 60-1000 Hz, to the discharge lamp. In the power supply apparatus, while alternating current of frequency (FL), which is lower than stationary frequency (FH), is inserted periodically into the alternating current of stationary frequency (FH), when a lighting current value (IL) of the discharge lamp is smaller than a predetermined lower limit (ILmin), the frequency (FL) is set as predetermined minimum frequency (Flmin); when the lighting current value (IL) of a discharge lamp is larger than a predetermined maximum value (ILmax), the frequency (FL) is set as predetermined maximum frequency (FLmax); and when a lighting current value (IL) of the discharge lamp is between the lower limit (ILmin) and the maximum value (ILmax), while frequency (FLsel) corresponding to the lighting current value is selected and set, the selected and set frequency (FLsel) becomes large or increases, so that a frequency change degree (ΔFL) increases as a lighting current value (ΔIL) becomes large or increases.

In the power supply apparatus, when the lighting current value of the discharge lamp is smaller than the predetermined lower limit (ILmin), the stationary frequency (FH) of the alternating current may be set as a predetermined minimum frequency (FHmin); when the lighting current value of the discharge lamp is larger than the predetermined maximum value (ILmax), the stationary frequency (FH) of the alternating current may be set as a predetermined maximum frequency (FHmax); and when the lighting current value of a discharge lamp is between the lower limit (ILmin) and the maximum value (ILmax), while the frequency (FHsel) corresponding to the lighting current value may be selected and set, the selected and set frequency (FHsel) may become large so that the change degree (ΔFH) increases as the lighting current value (IL) becomes large.

Further, the low frequency (FL) of the alternating current which is periodically inserted, may be changed stepwise according to change of the lighting current value (IL) of the discharge lamp.

Moreover, the power supply apparatus may hold or store data, as a table, that shows a relation between the lighting current value (IL) and the frequency (FL) corresponding thereto, for every rated power value (WL) of the discharge lamp.

Values or data of the table may be changed with an accumulated lighting time of the discharge lamp. For example, the values of the table may be changed with the accumulated lighting time of the discharge lamp, so that the frequency (FLsel) corresponding to the lighting current value (IL) becomes smaller than the frequency (FLsel) that is set in an early stage. Or, the values of the table may be changed while a predetermined change of voltage (ΔVL) is detected during the discharge lamp's lighting. Moreover, the data of the table may be changed so that the frequency (FLsel) corresponding to the lighting current value (IL) becomes smaller than the frequency (FL), which is set in the early stage, while the predetermined change of the voltage (ΔVL) is detected during the discharge lamp's lighting.

Operations and effects of the present invention based on the structure of the present invention are as follows. First, a projection is formed at the tip of an electrode, so that a stable arc discharge is formed from the projection as a starting point. This does not remove the projection as disclosed in Japanese Patent Application Publication No. 2002-175890, but positively forms a projection. With this, it is possible to stabilize lighting of the discharge lamp by the arc started at the projection which is a starting point. Secondly, it is possible to prevent generation of an excessive projection other than the projection which serves as the arc starting point. If two or more projections are formed, a so called arc jump occurs between these projections, so that an arc becomes unstable. While in the present invention, only the projection which serves as an arc starting point is formed and maintained, the excessive projections other than the above mentioned projection are eliminated. Thirdly, when the lighting current of the lamp changes in constant electric power control, the same function and effects as those of the above can be attained under the optimal conditions. Especially, when a lamp current value is small, even if low frequency (FL) is inserted, since the heating action to the electrode is small, the frequency is set to low. On the contrary, when a lamp current value is large, since the heating effect due to insertion of low frequency (FL) is large, the frequency is set up high. However, if the low frequency (FL) is set up only in consideration of a relation with lamp current, the phenomenon of flickering occurs in the discharge lamp. In addition, there is a problem that the synchronization with stationary frequency cannot be performed. As a result of examining such a situation wholeheartedly, the optimal lighting conditions are found by the present invention.

BRIEF DESCRIPTION OF DRAWINGS

Other features and advantages of the present high pressure discharge lamp lighting apparatus will be apparent from the ensuing description, taken in conjunction with the accompanying drawings, in which:

FIG. 5 shows a numerical example of a high pressure discharge lamp lighting apparatus according to the present invention;

FIG. 6 shows a numerical example of a high pressure discharge lamp lighting apparatus according to the present invention;

FIG. 8 shows a numerical example of a high pressure discharge lamp lighting apparatus according to the present invention.

DETAILED DESCRIPTION OF THE INVENTION

Figure 1:
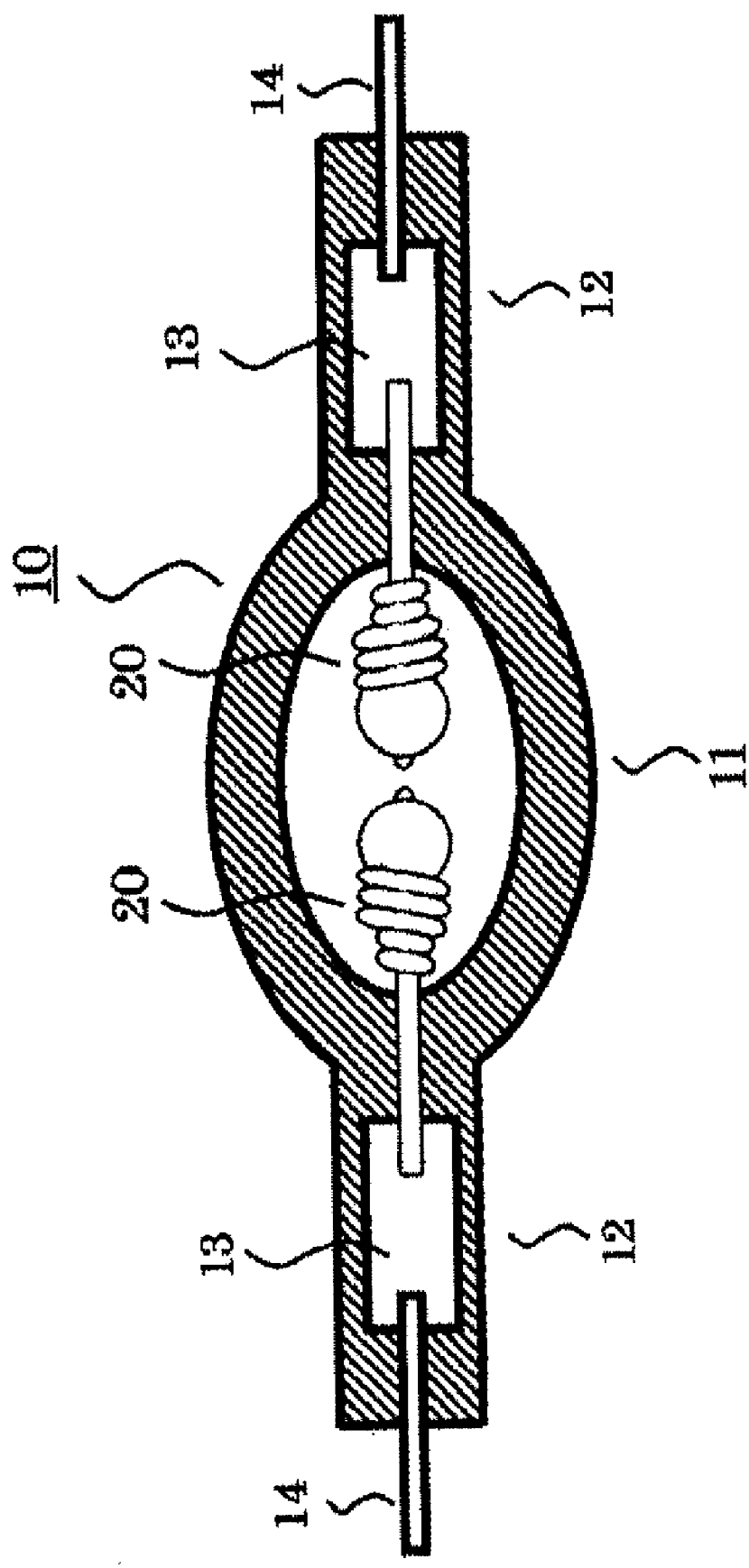
FIG. 1 shows a high pressure discharge lamp according to the present invention.

FIG. 1 shows a high pressure discharge lamp according to the present invention. A discharge lamp 10 has an approximately spherical light emission section 11, which is a part of a discharge container made of quartz glass. A pair of electrodes 20, which face each other, are arranged at an interval of 2 mm or less in the light emission section 11. Moreover, sealing portions 12 are formed at both ends of the light emission section 11. The metallic foil 13 for electric conduction, which is made of molybdenum, is airtightly buried in each sealing portion 12 by shrink sealing. The axis portion of each electrode 20 is joined at one end of metallic foil 13, and an external lead 14 is joined to the other end of the metallic foil 13 so that they are electrically connected with a power supply apparatus. Mercury, rare gas, and halogen gas are enclosed in the light emission section 11. Mercury is enclosed in order to obtain required visible light, for example, radiation light having a wavelength of 360-780 nm, wherein the amount of the mercury to be enclosed is 0.2 mg/mm$^3$ or more. Although the amount enclosed mercury is changed depending on temperature conditions, the vapor pressure becomes very high, such as 200 or more atmospheric pressure at time of lighting. Moreover, a discharge lamp whose mercury vapor pressure is 250, or 300 or more atmospheric pressure at time of lighting, can be fabricated by enclosing more mercury, and if the mercury vapor pressure is made higher, a light source suitable for a projector apparatus can be realized.

The rare gas such as argon gas whose amount is, for example, approximately 13 kPa, is enclosed in order to improve lighting startability. The halogen gas is enclosed therein in form of a compound of mercury or other metal with iodine, bromine, chlorine or the like. The enclosed amount halogen gas is selected from a range of $10^{-6}$ to $10^{-2}$ μmol/mm$^3$. Although achieving a longer life span (using the so-called halogen cycle) is the function of the halogen, there is also a function of preventing denitrification of the discharge container, in the case where there is a very small discharge lamp and a very high lighting vapor pressure, as in the present invention.

The specifications (numerical examples) of a discharge lamp are set forth below. For example, the maximum outer diameter of the light emission section is 9.4 mm, the distance between the electrodes is 1.0 mm, and the internal volume of the arc tube is 75 mm$^3$. Rated voltage applied thereto is 70 V, and rated power applied thereto is 135 W, wherein the discharge lamp is lighted with alternating current lighting. Moreover, this kind of discharge lamp is built in a projector apparatus for a miniaturization purpose, wherein while a severe miniaturization is required in an overall dimension, high intensity of light emission is also required. For this reason, the thermal influence on the light emission section becomes very severe. A bulb wall load value of the lamp is 0.8-2.0 W/mm$^2$, specifically, 1.8 W/mm$^2$. When a discharge lamp having such a high mercury vapor pressure and a bulb wall load value is installed in an apparatus for presentation such as a projector apparatus or an overhead projector, it is possible to provide radiation light with good color rendering properties.

The phenomenon in which such a projection at the tip of the electrode 20 (an end portion which face the other electrode) is formed with lamp lighting, can be explained as set forth below. That is, tungsten (the composition material of the electrodes), which is evaporated from a hot section near the tip of the electrode during a lamp lighting operation, is bound with halogen and/or remaining oxygen which exists in an arc tube, and, for example, if the halogen is Br, it exists as tungsten compounds, such as $WBr$, $WBr_2$, $WO$, $WO_2$, $WO_2Br$, and $WO_2Br_2$. These compounds are degraded so as to be tungsten atoms or cations in the hot section in the gaseous phase near the electrode tip. In addition to temperature diffusion (diffusion of the tungsten atoms, which goes toward a low temperature section, i.e., a portion around the tip of the electrode, from the hot section in a gaseous phase, i.e., an arc), the tungsten atoms are ionized in the arc, becoming cations. When an electrode functions as a cathode, the tungsten steamy density in the gaseous phase near the tip of the electrode becomes high since it is drawn in the direction of the cathode by electric field (namely, drift), so that precipitation takes place at the tip of the electrode.

Figure 2:
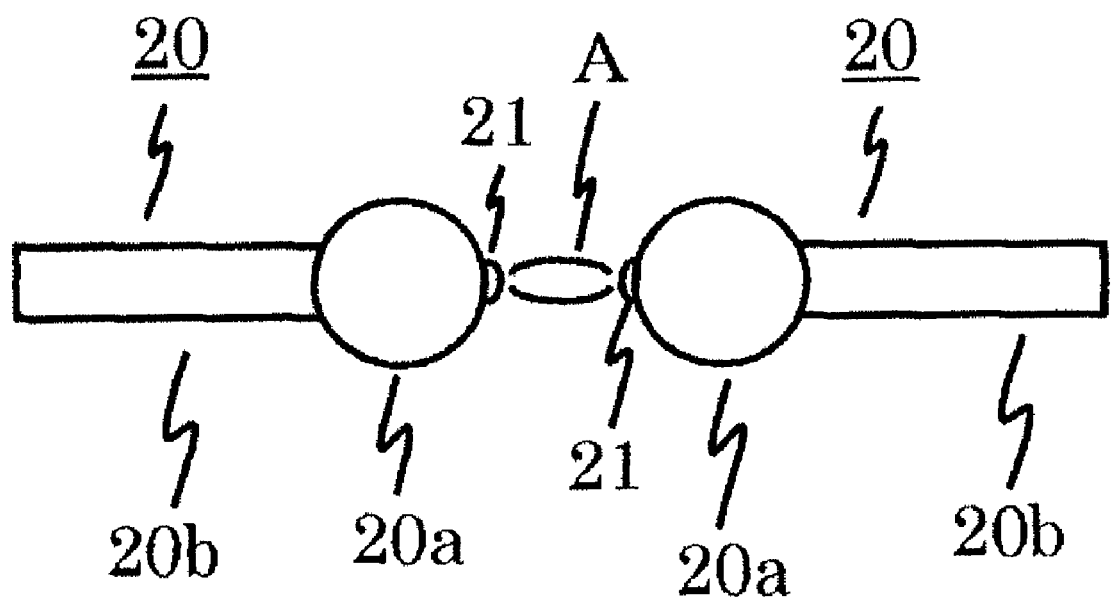
FIG. 2 shows an electrode of a high pressure discharge lamp according to the present invention.

FIG. 2 is a diagram of the electrodes having the projections, wherein the tips of the electrodes 20 shown in FIG. 1 are schematically shown. Each of the electrodes 20 consists of a sphere section 20a and an axis portion 20b, and a projection 21 which is formed at the tip of the sphere section 20a of each electrode 20. Even though the projection 21 does not exist at the initiation of lamp lighting, it is formed in a subsequent lighting operation. These projections are not necessarily formed in any discharge lamp that is lit, but such projections are formed if the distance between the electrodes is 2 mm or less, and a short arc type discharge lamp in which 0.15 mg/mm$^3$ or more of mercury, rare gas, and halogen in a range of $1 \times 10^{-6}$ to $1 \times 10^{-2}$ μmol/mm$^3$ are enclosed in the light emission section. In addition, a numerical example of the size of a projection is given below. The maximum dimension (diameter) of the electrode (in direction perpendicular to the electric discharge direction) is φ0.1.0-1.5 mm, and when the distance between electrodes is 1.0-1.5 mm, the diameter of the projection becomes about 0.2-0.6 mm.

Such a projection becomes indispensable when the discharge lamp according to the present invention, in which the distance between electrodes is 2 mm or less, and mercury of 0.2 mg/mm$^3$ or more is enclosed in a light emission section, is used as a light source of a projector apparatus. This is because, in the discharge lamp that encloses 0.2 mg/mm$^3$ or more of mercury in a light emission section and that has a pressure reaching 200 or more atmospheric pressures in operation, the arc discharge is suppressed to be small due to high vapor pressure suppressing an electric discharge starting point so as to be smaller. As disclosed in Japanese Patent Application Publication No. 2002-175890, in an electrode having a spherical shape in which a projection is removed, an electric discharge starting point moves jiggly, thereby causing a problem of a flickering on an image screen of the projector apparatus. Especially, when an arc luminescent spot is formed in the case where a distance between electrodes is short, that is, 2 mm or less, and those electrodes move even slightly by 0.5 mm or less, the results is a flicker fatal for an image screen.

In the above view, it is considered that in the discharge lamp disclosed in Japanese Patent Application Publication No. 2002-175890, since the amount of mercury enclosed is at a level of 0.18 mg/mm$^3$ unlike the present invention in which the enclosed mercury is 0.20 mg/mm$^3$ or more, an electric discharge arc and an electric discharge starting point are unlikely to be suppressed. However, it was possible to solve the problem of the flicker if the electrode has a spherical surface at a tip thereof.

Moreover, since arc discharge occurs with a formation of projection at the tip of the electrode, the arc discharge occurs from the projection as a starting point, so that light from the arc is hard to be blocked by a sphere section 20a of the electrode. For this reason, the use efficiency of light is improved and a brighter image is obtained. In addition, although FIG. 2 is a schematic view of the electrodes, an element corresponding to the sphere section which has a larger diameter than axis diameter is usually provided at the tip of each axis portion 20b.

Alternating current lighting of the high pressure discharge lamp is performed at stationary frequency FH (60-1000 Hz) by the power supply apparatus described below. Moreover, the frequency FL (low frequency), which is lower than the stationary frequency, is periodically inserted during the operation of stationary frequency (FH). The low frequency is 5-200 Hz, wherein the number of waves to be inserted is in a range of one to ten units when a half cycle is regarded as one unit, and an interval at which the frequency is inserted in the stationary frequency is in a range of 0.01 seconds to 120 seconds.

Figure 3:
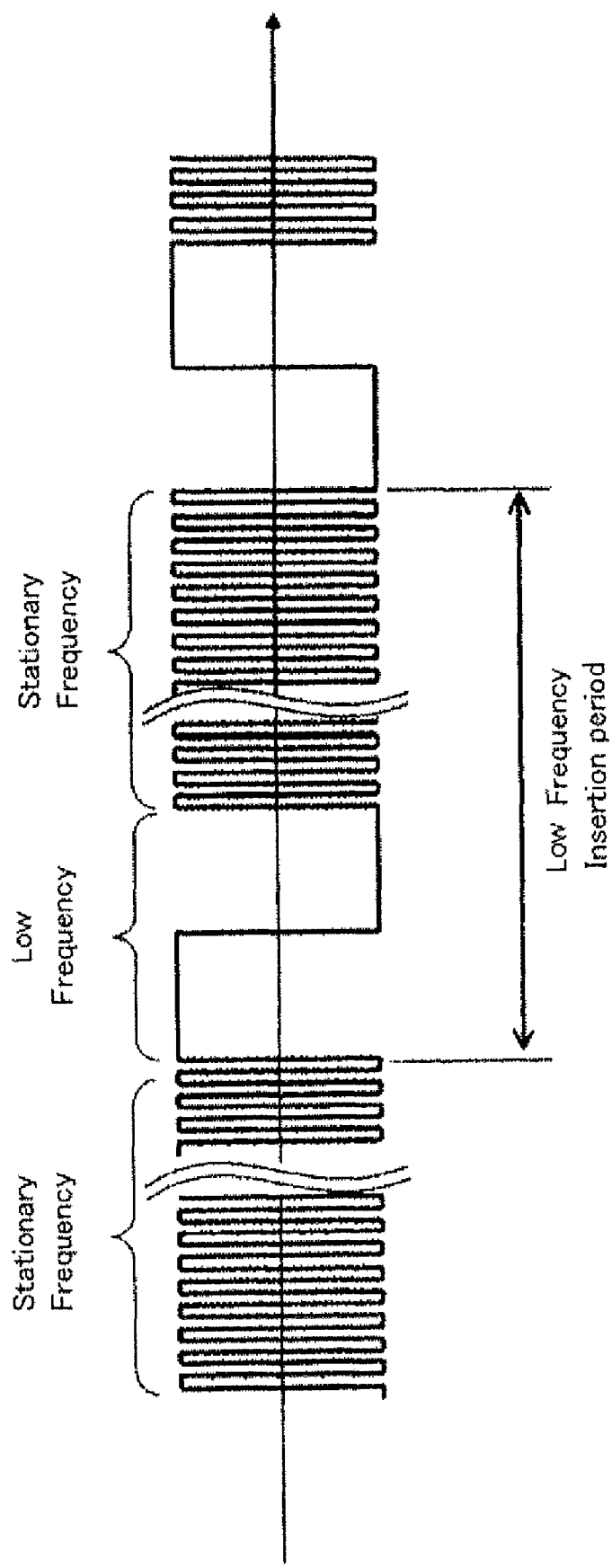
FIG. 3 shows a current waveform of a discharge lamp according to the present invention.

FIG. 3 shows a current waveform applied to the discharge lamp 10, wherein a vertical axis represents a current value and a horizontal axis represents time. As shown in the figure, the current waveform applied to the discharge lamp is alternating current of the stationary frequency (FH) of 200 Hz, and the alternating current of low frequency (FL) of 10 Hz is intermittently and periodically inserted in the alternating current of the stationary frequency (FH). The low frequency (FL) is selected from a range of 5-200 Hz, and the interval (insertion interval of the low frequency) at which the low frequency is intermittently and periodically inserted in the alternating current of the stationary frequency, is time selected from a range of 0.01-120 seconds. The interval at which the low frequency is inserted into the stationary frequency, is a period indicated as the "low frequency insertion period" in the figure, which is defined as a time interval, from a start point from which a low frequency waveform begins, to a time point from which the following low frequency waveform begins. Moreover, the number of waves to be inserted is selected from a range of one to ten units when a half cycle is regarded as one unit. Incidentally, in the figure, the number of wave units is two. In such a case where the number of waves to be inserted is selected from a range of one to ten units, the low frequency is intermittently (periodically) inserted for a period of a half cycle to five cycles.

A function and effect of the intermittent (periodic) insertion of the low frequency in the stationary frequency is explained below. As described above, from a viewpoint of arc stability, it is advantageous to form a projection at the tip of the electrode of the discharge lamp according to the present invention. However, when generation of a projection is controlled, projections other than the projection which is originally needed are also derived. The present invention is based on the finding that the unnecessary projections can be eliminated due to an intermittent (periodic) insertion of the low frequency in the stationary frequency.

Figure 4:
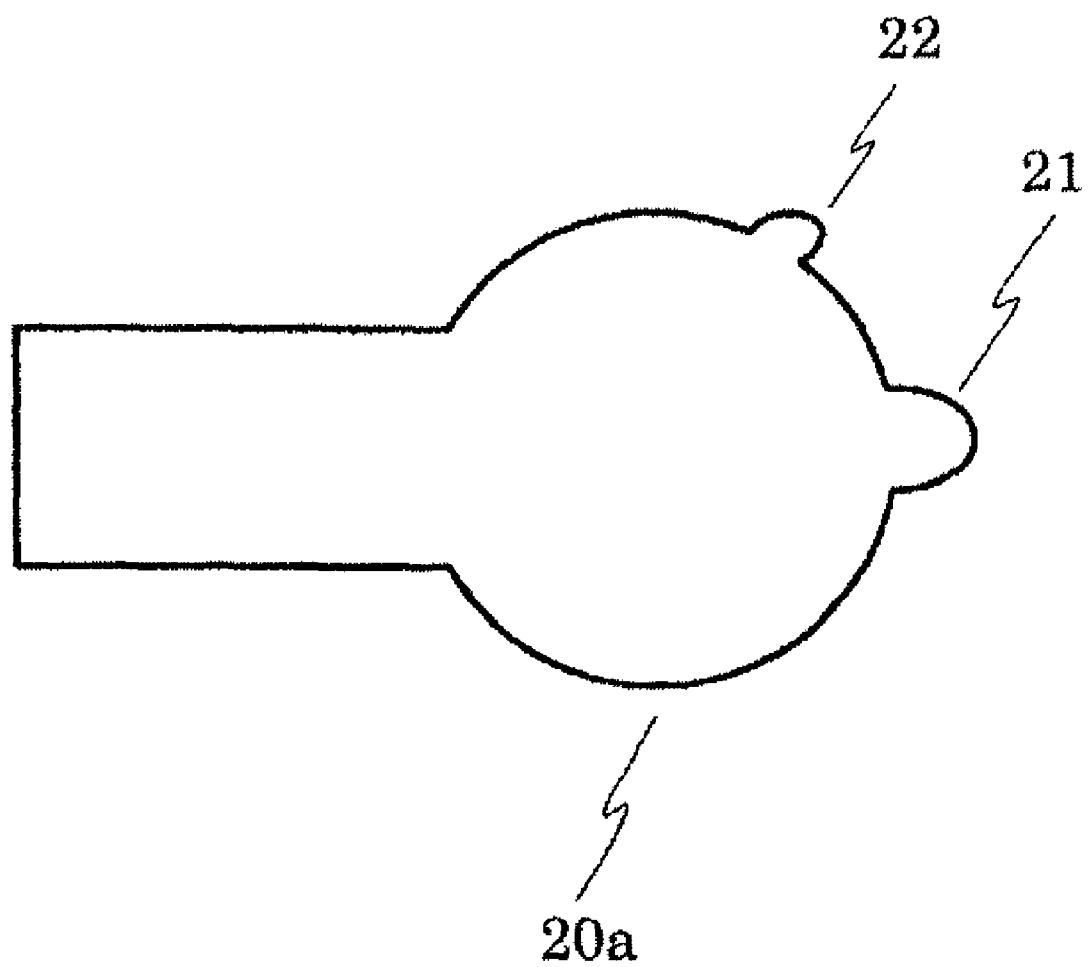
FIG. 4 is an explanatory enlarged view of an electrode according to the present invention.

FIG. 4 is a comparison diagram of an electrode for explaining the present invention, which schematically shows an undesirable state where frequency control according to the invention is not performed. If a lamp is turned on, a projection 21 (a first projection) is formed at the tip of a sphere section 20a of an electrode as a center. This projection 21 becomes an electric discharge starting point and is needed to stabilize an arc. Another projection 22 (a second projection) is produced around the projection 21, as the lamp is continuously lighted. This projection 22 is not originally needed, and causes a problem of the so-called flicker because the electric discharge starting point moves between these projections 21. The number of the second projections is not limited to one but may be two or more.

The phenomenon in which the unnecessary projection 22 (second projection) is produced and grows is explained below. There is a temperature distribution in the electrode surface during a discharge lamp operation. The tip section is the highest temperature, and the temperature of the electrode surface decreases as the other side is approached (back side).

In the high temperature area near the tip of the electrode, an electrode surface is eroded by evaporation of tungsten and tungsten oxide, such as WO and $WO_2$, which is produced by reacting with oxygen remaining in the discharge container. However, since the tungsten steamy density is high in the arc at the tip of the electrode, which is an electric discharge starting point, as described above, the tungsten precipitates and deposits forming that the first projection. On the other hand, the electrode surface area, which is low in temperature, is also eroded due to evaporation of bromine enclosed in the discharge container, and the reaction with the remaining oxygen produces WBr, $WBr_2$, $WO_2Br$, and $WO_2Br_2$ etc. That is, although the kinds of tungsten compounds which evaporate depending on the temperature of the electrode surface, differ from each other, both the high temperature area and the low temperature area of the electrode surface are eroded. Next, in the middle temperature area whose temperature is between that of the high temperature area of the electrode surface and that of the low-temperature area thereof, there is little generation of the above mentioned tungsten compounds due to the thermochemical property of the tungsten, so that there is little erosion of the electrode surface. Rather, since precipitation and deposition of the tungsten steam, which exists in the discharge container, is more dominant, the second projection grows.

Thus, it is necessary to maintain the first projection, without letting it disappear, since it is indispensable. On the other hand, the second projection(s) is not necessary and should be removed. The frequency control of the present invention is to remove the second projection (s). The mechanism thereof is explained below.

When regular lighting of the discharge lamp is performed at frequency of 60 to 1,000 Hz, as described above, in an area of an electrode surface whose temperature is in-between, the second projection begins to grow. At this time, when the frequency is changed from the stationary frequency to frequency lower, the period in which the electrode serves as an anode becomes long so that the temperature at the tip of the electrode increases. Thus, the temperature also rises in the in-between temperature area where the second projection begins to grow, raising the surface temperature of the area. As a result, the second projection evaporates and erodes until it disappears. In order to suppress generation and growth of the second projection, it is essentially important to change, in time, the temperature of the electrode surface. For example, even if the temperature of the entire surface of the electrode is set to high by making the size of the electrode small, the second projection is generated in a portion on a back side of the electrode, where the temperature thereof is low, preventing suppression of the second projection generation. That is, in the present invention, the temperature of the electrode surface is changed at a suitable time interval, so that generation of the second projection in a fixed position is prevented. A structure of periodically inserting low frequency is adopted as a means therefor.

The frequency is selected from a range of 5-200 Hz, and the number of waves to be inserted is selected from a range of one to ten units when a half cycle is regarded as one unit. Further, an interval at which the low frequency is inserted into the stationary frequency is selected from a range of 0.01 to 120 seconds. When the frequency of the low frequency is less than 5 Hz and the number of waves is greater than ten units, or when the insertion interval is less than 0.01 second, the temperature at the tip of the electrode becomes too high, removing both the second projection and the first indispensable projection. Moreover, when the frequency is higher than 200 Hz, or when the number of units is smaller than one unit, a sufficient temperature rise is not acquired in the area where the second projection is generated, so that the second projection cannot be eliminated. Moreover, when the insertion interval is longer than 120 seconds, the second projection grows too much during the stationary lighting, so that even though the low frequency is inserted, the second projection cannot be eliminated.

Here, in the discharge lamp according to the present invention, it is a prerequisite that the amount of mercury to be enclosed is 0.2 $mg/mm^3$ or more. According to experiments of the present inventors, when the enclosed amount of mercury is less than 0.2 $mg/mm^3$, specifically, in case of 0.18 $mg/mm^3$, it was confirmed that influence on the arc due to the mercury vapor pressure during lighting was small. That is, when the enclosed amount of mercury is about 0.18 $mg/mm^3$, even in case where a surface at the tip of an electrode is smooth (no projection), an arc does not move. However, if the enclosed amount of mercury becomes 0.2 $mg/mm^3$ or more, the suppression effect to an arc due to the vapor pressure during lamp lighting becomes remarkably large, whereby, the phenomenon of movement of an arc (fluctuation) occurs. In the present invention, in a discharge lamp where the enclosed amount of mercury is 0.2 $mg/mm^3$ or more, formation of a projection at the tip of an electrode is indispensable in order to stabilize an arc. Under a condition that a projection exists at the tip of the electrode, the feature of the present invention is that lighting based on predetermined low frequency is intermittently (periodically) inserted in order to prevent generation and growth of any unnecessary projections.

Furthermore, when the lighting current (also referred to as "lamp current") of the discharge lamp changes, the low frequency (FL) is changed according to the change of the lighting current. Moreover, since the high pressure discharge lamp according to the present invention is controlled in a manner of constant electric power lighting by a power supply apparatus so that the lamp current also changes when lighting voltage (also referred to as "lamp voltage") of the discharge lamp changes, the low frequency (FL) also changes. The constant electric power control is performed in order to uniformly maintain the lighting electric power supplied to the discharge lamp from the power supply apparatus, to keep the level of an optical output stable, and to keep the load to the discharge lamp, especially the thermal load to the discharge container made of quartz glass, constant.

As a result of earnest examination by the present inventors, while the low frequency (FL) is adjusted finely according to change of the lamp current (IL), a value of the low frequency (FL) is fixed in case of the maximum value (ILmax) and the lower limit (ILmin) of the lamp current (IL). Furthermore, control is performed so that a change degree ($\Delta$FL) of the low frequency (FL) increases as the lamp current (IL) increases.

Furthermore, in the present invention, while not only the low frequency (FL) but also stationary frequency (FH) are adjusted finely according to the change of the lamp current (IL), the stationary frequency (FH) in the maximum value (ILmax) and the lower limit (ILmin) of the lamp current (IL) is fixed. And, control is performed so that the change degree ($\Delta$FL) of the low frequency (FL) increases as the lamp current (IL) increases.

FIG. 5 shows a numerical example of the lamp current IL, the stationary frequency (FH), and the low frequency (FL), in the high pressure discharge lamp lighting apparatus according to the present invention, wherein rated power thereof is 180 W. In the figure, when the lamp current (IL) is smaller than 2.0 A, the stationary frequency (FH) is fixed to 74 Hz, and the low frequency (FL) is fixed to 24.67 Hz. At this time, the lamp current is the lower limit (ILmin), 74 Hz becomes the lower limit (FHmin) of the stationary frequency, wherein 24.67 Hz becomes the lower limit (FLmin) of the low frequency. Similarly, when the lamp current (IL) is larger than 2.6 A, the stationary frequency (FH) is fixed to 740 Hz, and the low frequency (FL) is fixed to 370 Hz. At this time, the lamp current is a maximum value (ILmax), wherein 740 Hz becomes the maximum value (FHmax) of the stationary frequency, and 370 Hz becomes the maximum value (FLmax) of the low frequency.

When the lamp current (IL) is more than 2.0 A and is smaller than 2.1 A (2.0 A≦IL<2.1 A), the stationary frequency (FH) is set to 74 Hz and the low frequency (FL) is set to 24.67 Hz. At this time, the amount of increase (ΔFL) is zero (0) and the low frequency (FL) of the amount of increase (ΔFH) of the stationary frequency (FH) is zero (0). When the lamp current (IL) is 2.1 A or more and smaller than 2.2 A (2.1 A≦IL<2.2 A), the stationary frequency (FH) is 148 Hz and the low frequency (FL) is set to 29.6 Hz. The amount of increase (ΔFH) of the stationary frequency (FH) is 74 Hz, and the amount of increase (ΔFL) of the low frequency (FL) is 4.93 Hz. When the lamp current (IL) is 2.2 A or more and smaller than 2.3 A (2.2 A≦IL<2.3 A), the stationary frequency (FH) is 370 Hz and the low frequency (FL) is set to 46.25 Hz. The amount of increase (ΔFH) of the stationary frequency (FH) is 222 Hz and the amount of increase (ΔFL) of the low frequency (FL) is 16.65 Hz. When the lamp current (IL) is 2.3 A or more and smaller than 2.4 A (2.3 A≦IL<2.4 A), the stationary frequency (FH) is set to 740 Hz and the low frequency (FL) is set to 74 Hz. The amount of increase (ΔFH) of the stationary frequency (FH) is 370 Hz and the amount of increase (ΔFL) of the low frequency (FL) is 27.75 Hz. When the lamp current (IL) is 2.4 A or more and smaller than 2.5 A (2.4 A≦IL<2.5 A), the stationary frequency (FH) is set to 740 Hz and the low frequency (FL) is set to 123.33 Hz. The amount of increase (ΔFL) of the low frequency (FL) is 49.33 Hz. When the lamp current (IL) is 2.5 A or more and smaller than 2.6 A (2.5 A≦IL<2.6 A), the stationary frequency (FH) is 740 Hz and the Low frequency (FL) is set to 185 Hz. The amount of increase (ΔFL) of the low frequency (FL) is 61.67 Hz.

As mentioned above, the amount of increase (ΔFL) of the low frequency (FL) increases, as the lamp current (IL) is larger. Moreover, the amount of increase (ΔFH) of the stationary frequency (FH) also increases, as the lamp current (IL) is larger.

FIG. 6 shows a numerical example of the lamp current IL, the stationary frequency (FH), and the low frequency (FL), in the high pressure discharge lamp lighting apparatus according to the present invention, wherein rated power thereof is 144 W. In the figure, when the lamp current (IL) is smaller than 1.6 A, the stationary frequency (FH) is fixed to 74 Hz, and the low frequency (FL) is fixed to 24.67 Hz. At this time, the lamp current is the lower limit (ILmin), wherein 74 Hz becomes the lower limit (FHmin) of the stationary frequency, and 24.67 Hz becomes the lower limit (FLmin) of the low frequency. Similarly, when the lamp current (IL) is larger than 1.6 A, the stationary frequency (FH) is fixed to 925 Hz and the low frequency (FL) is fixed to 462.5 Hz. At this time, the lamp current is a maximum value (ILmax), wherein 925 Hz becomes the maximum value (FHmax) of the stationary frequency, and 462.5 Hz becomes the maximum value (FLmax) of the low frequency.

When the lamp current (IL) is 1.6 A or more and smaller than 1.7 A (1.6 A≦IL<1.7 A), the stationary frequency (FH) is set to 74 Hz and the low frequency (FL) is set to 24.67 Hz. When the lamp current (IL) is 1.7 A or more and smaller than 1.8 A (1.7 A≦IL<1.8 A), the stationary frequency (FH) is set to 154.2 Hz and the low frequency (FL) is set to 25.7 Hz. The amount of increase (ΔFH) of the stationary frequency (FH) is 80.2 Hz, and the amount of increase (ΔFL) of the low frequency (FL) is 1.03 Hz. When the lamp current (IL) is 1.8 A or more and smaller than 1.9 A (1.8 A≦IL<1.9 A), the stationary frequency (FH) is set to 462.5 Hz and the low frequency (FL) is set to 46.25 Hz. The amount of increase (ΔFH) of the stationary frequency (FH) is 308.3 Hz and the amount of increase (ΔFL) of the low frequency (FL) is 20.55 Hz. When the lamp current (IL) is 1.9 A or more and smaller than 2.0 A (1.9 A≦IL<2.0 A), the stationary frequency (FH) is 925 Hz and the low frequency (FL) is set as 92.5 Hz. The amount of increase (ΔFH) of the stationary frequency (FH) is 462.5 Hz, and the amount of increase (ΔFL) of the low frequency (FL) is 46.25 Hz. When the lamp current (IL) is 2.0 A or more and smaller than 2.1 A (2.0 A≦IL<2.1 A), the stationary frequency (FH) is set to 925 Hz and the low frequency (FL) is set to 154.17 Hz. The amount of increase (ΔFL) of the low frequency (FL) is 61.67 Hz. When the lamp current (IL) is 2.1 A or more and smaller than 2.2 A (2.1 A≦IL<2.2 A), the stationary frequency (FH) is set to 925 Hz and the low frequency (FL) is set to 231.25 Hz. The amount of increase (ΔFL) of the low frequency (FL) is 81.08 Hz.

As mentioned above, the amount of increase (ΔFL) of the low frequency (FL) increases, as the lamp current (IL) increases. Moreover, the amount of increase (ΔFH) of the stationary frequency (FH) also increases, as the lamp current (IL) increases.

As in the embodiment described above, the low frequency (FL) is desirably changed stepwise, according to change of the lighting current value (IL) of the discharge lamp. This is because the stationary frequency (FH) and the low frequency (FL) desirably have integral multiple relations, for example, a relation synchronous with a color filter etc. Moreover, to avoid disorder on the screen called a scroll bar, which is produced relating to the scanning speed of a LCD, the frequency being an integral multiple of LCD scanning frequency, for example, 50 Hz, 60 Hz, and 72 Hz, is avoided.

Figure 7A:
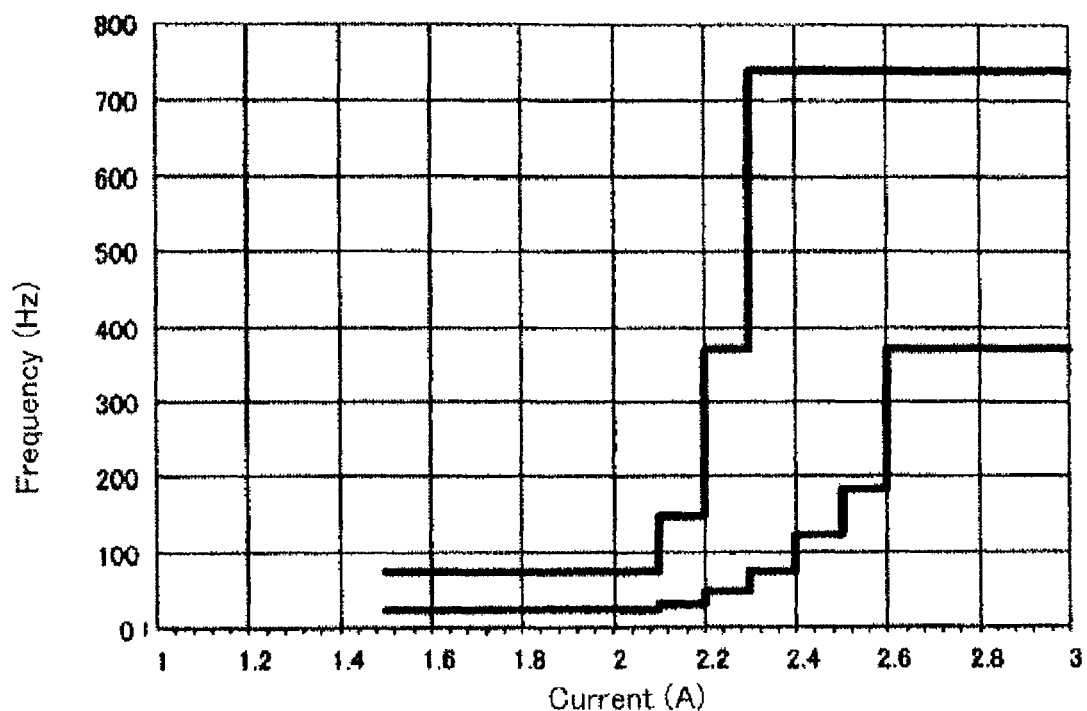
FIGS. 7A and 7B show graphs of the numerical example of a high pressure discharge lamp lighting apparatus according to the present invention.
Figure 7B:
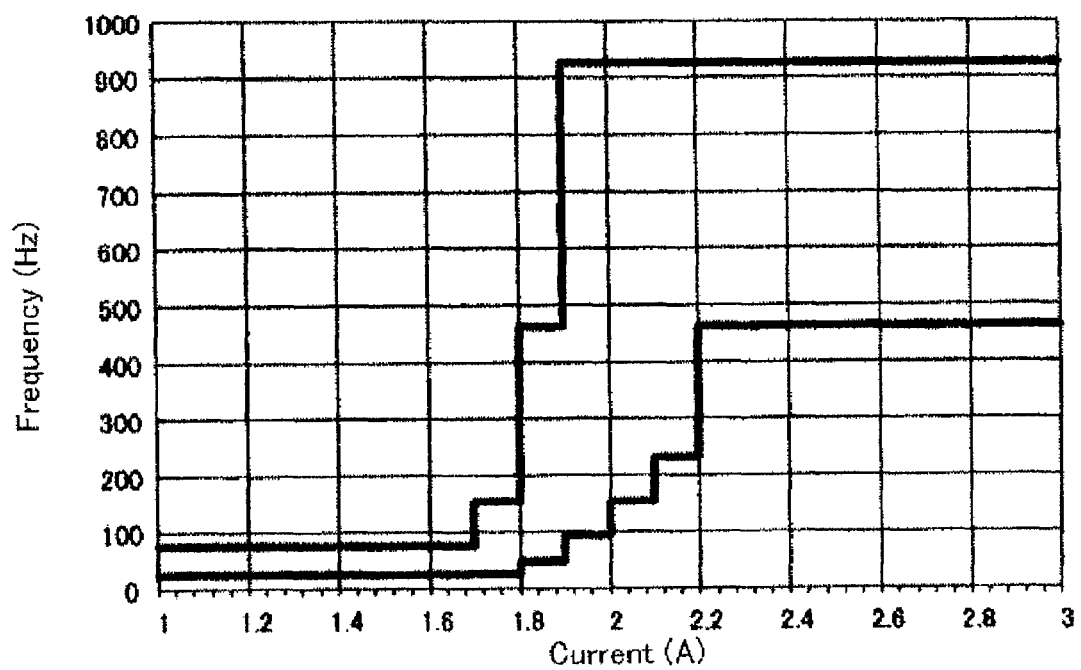

FIGS. 7A and 7B are graphs showing relation of the lamp current value (IL), the stationary frequency (FH) and the low frequency (FL). Specifically, FIG. 7A shows the relation in case of the discharge lamp whose rated power is 180 W, and FIG. 7B shows the relation in case of the discharge lamp whose rated power is 144 W. In the figure, a vertical axis represents frequency (Hz) and a horizontal axis represents the lamp current value (A), respectively. It turns out from the figure, that responding to the increase in the lamp current value (IL), both the stationary frequency (FH) and the low frequency (FL) increase stepwise. Moreover, it can be understood that both the amount of increase (ΔFH) of the stationary frequency (FH) and the amount of increase (ΔFL) of the low frequency increase as the lamp current value (IL) increase.

Furthermore, as in the examples shown in FIGS. 5 and 6, it is desirable that the power supply apparatus holds (stores in a memory) data, as a table, such as, the lighting current value (IL), and the low frequency (FL) and the stationary frequency (FH) corresponding thereto, for every rated power value (WL) of the discharge lamp.

In particular, it is desirable that there is a function for changing data in the table with the accumulated discharge lamp lighting time. In particular, the frequency (FL) corresponding to the lighting current value (IL) may be changed so as to be lower than the frequency (FL), which has been determined in an early or initial stage. The present inventors found out that the tendency of the phenomenon in which lamp voltage unstably changes, increases with passage of the lighting time of the discharge lamp. This is not desirable because it leads to change of light flux which is caught, as it is, by an optical system. Although the electrodes of the discharge lamp are designed so that exhausted tungsten may be reused in a halogen cycle, since, with lighting time, the tungsten may return to portions other than the tip of the electrode or may be condensed on a wall portion of an arc tube whose temperature is too low, 100% of the tungsten does not necessarily return to the tip of the electrode for reuse. From the result of observation, it is thought that, in the phenomenon of the lamp voltage change, when the tungsten in an arc becomes less abundant with lighting time, reformation of a projection at the tip of the electrode becomes insufficient so that only an insufficient and thin projection at the tip is formed whereby wearing of the electrode is likely to arise. Furthermore, it is understood that when wear damage of the electrode arises, the distance between the electrodes is elongated, and, in the power supply by which a lamp is turned on with constant lamp electric power, when the lamp voltage becomes high, the lamp current becomes low in general, so that the amount of the melted electrode decreases and the amount of tungsten in the arc further decreases, whereby the above mentioned vicious circle is accelerated. In order to solve these problems, it is desirable to make the melting point achieving temperature area at the tip of an electrode large, according to the accumulated lighting time of the discharge lamp, thereby increasing the amount of tungsten in the arc. That is, when the low frequency (FL) or the frequency (FH), which corresponds to the lighting current value (IL), is made smaller than an initial lighting value of the lamp, the melting point achieving temperature area at the tip of the electrode which, in the polarity, has served as an anode, is expanded, so that the amount of tungsten in an arc, which is required for re-formation of a projection having current resistance can be adjusted. Specifically, tables for every passage of accumulated lighting time, which are different from another, may be used. For example, in a table which holds or stores (in a memory) data, such as, a lighting current value (IL) and the low frequency (FL), which corresponds to the light current value (IL), or the frequency (FH) and the stationary frequency (FH), the lighting current value (IL) may be achieved by selecting one or more set low frequencies, depending on lapsed time of accumulated lighting time. The accumulated lighting time of the discharge lamp may be recorded by a projector or a lighting power supply. Of course, after replacing the lamp with a new lamp, record of accumulated lighting time is reset.

FIG. 8 is a frequency table of a discharge lamp shown in FIG. 5, wherein the frequency changes with accumulated lighting time. When the accumulated lighting time is 0-1000 hours, it is the same as the table shown in FIG. 5. At this time, where the lamp current (IL) is smaller than 2.0 A, the frequency specification mode is referred to as No. 1, and where the lamp current (IL) is larger than 2.6 A, the frequency specification mode is referred to as No. 8. Where the lamp current (IL) is 2.0 A or more and smaller than 2.1 A (2.0 A≦IL<2.1 A), the frequency specification mode is referred to as No. 2. Where the lamp current (IL) is 2.1 A or more and smaller than 2.2 A (2.1 A≦IL<2.2 A), the frequency specification mode is referred to as No. 3. Where the lamp current (IL) is 2.2 A or more and smaller than 2.3 A (2.2 A≦IL<2.3 A), the frequency specification mode is referred to as No. 4. Where the lamp current (IL) is 2.3 A or more and smaller than 2.4 A (2.3 A≦IL<2.4 A), the frequency specification mode is referred to as No. 5. Where the lamp current (IL) is 2.4 A or more and smaller than 2.5 A (2.4 A≦IL<2.5 A), the frequency specification mode is referred to as No. 6. Where the lamp current (IL) is 2.5 A or more and smaller than 2.6 A (2.5 A≦IL<2.6 A), the frequency specification mode is referred to as No. 7.

When the accumulated lighting time of the discharge lamp reaches 1000-2000 hours, although the frequency specification mode remains in No. 1 in the case where the lamp current (IL) is smaller than 2.0 A, the frequency specification mode is changed to No. 7 from No. 8 when the lamp current (IL) is larger than 2.6 A. Where the lamp current (IL) is 2.0 A or more and smaller than 2.1 A, the frequency specification mode is changed from No. 2 to No. 1, and where the lamp current (IL) is 2.1 A or more and smaller than 2.2 A the frequency specification mode is changed from No. 3 to No. 2. Where the lamp current (IL) is 2.2 A or more and smaller than 2.3 A, the frequency specification mode is changed from No. 4 to No. 3. Where the lamp current (IL) is 2.3 A or more and smaller than 2.4 A, the frequency specification mode is changed from No. 5 to No. 4. where the lamp current (IL) is 2.4 A or more and smaller than 2.5 A, the frequency specification mode is changed from No. 6 to No. 5. Where the lamp current (IL) is 2.5 A or more and smaller than 2.6 A, the frequency specification mode is changed from No. 7 to No. 6.

Furthermore, when the accumulated lighting time of the discharge lamp reaches 2000-5000 hours, although the frequency specification mode remains in No. 1 where the lamp current (IL) is smaller than 2.0 A, the frequency specification mode is changed to No. 6 from No. 7 where, the lamp current (IL) is larger than 2.6 A. Although the lamp current (IL) is 2.0 A or more and smaller than 2.1 A, the frequency specification mode remains in No. 1. However, where the lamp current (IL) is 2.1 A or more and smaller than 2.2 A, the frequency specification mode is changed from No. 2 to No. 1, and where the lamp current (IL) is 2.2 A or more and smaller than 2.3 A the frequency specification mode is changed from No. 3 to No. 2. In addition, where the lamp current (IL) is 2.3 A or more and smaller than 2.4 A, the frequency specification mode is changed from No. 4 to No. 3, and where the lamp current (IL) is 2.4 A or more and smaller than 2.5 A, the frequency specification mode is changed from No. 5 to No. 4, and further where the lamp current (IL) is 2.5 A or more and smaller than 2.6 A, the frequency specification mode is changed from No. 6 to No. 5.

Furthermore, when the accumulated lighting time of the discharge lamp reaches 5000 hours, although the frequency specification mode remains in No. 1 where the lamp current (IL) is smaller than 2.0 A, the frequency specification mode is changed from No. 6 to No. 5 where the lamp current (IL) is larger than 2.6 A. Hereafter, when the lamp current (IL) is 2.0 A or more and smaller than 2.1 A, the frequency specification mode remains in No. 1. Although when the lamp current (IL) is 2.1 A or more and smaller than 2.2 A, the frequency specification mode remains in No. 1. When the lamp current (IL) is 2.2 A or more and smaller than 2.3 A, the frequency specification mode is changed from No. 2 to No. 1. Where the lamp current (IL) is 2.3 A or more and smaller than 2.4 A, the frequency specification mode is changed from No. 3 to No. 2. Where the lamp current (IL) is 2.4 A or more and smaller than 2.5 A, the frequency specification mode is changed from No. 4 to No. 3. Where the lamp current (IL) is more than 2.5 A and smaller than 2.6 A, the frequency specification mode is changed from No. 5 to No. 4.

A function of changing the data stored in the table is desired, while detecting a predetermined voltage change (ΔVL) during the discharge lamp's lighting. Especially, while detecting the predetermined voltage change (ΔVL) during lighting of the discharge lamp when it is changed so that frequency (FLsel) corresponding to the lighting current value (IL) may become smaller than the frequency (FL), which has been determined in an early or initial stage. As mentioned above, attention is paid to the phenomenon of unstable change of lamp voltage with passage of the discharge lamp lighting time. In order to solve such a problem, it is desirable that the change of the lamp voltage itself is detected, and the frequency (FLsel) corresponding to the lighting current value (IL) is changed so as to be smaller than the frequency (FL), which has been determined in an early stage.

Moreover, to control the phenomenon of the unstable change of lamp voltage, after changing the frequency (FLsel) corresponding to the lighting current value (IL) so as to be smaller than the frequency (FL), which has been determined in an early stage, if such unstable change of the lamp voltage is not detected for a fixed period, for example, 100 to 500 hours, (it may be regarded that the problem has been solved), the setting may be returned to the frequency (FL, which was determined in the early stage.

Figure 9:
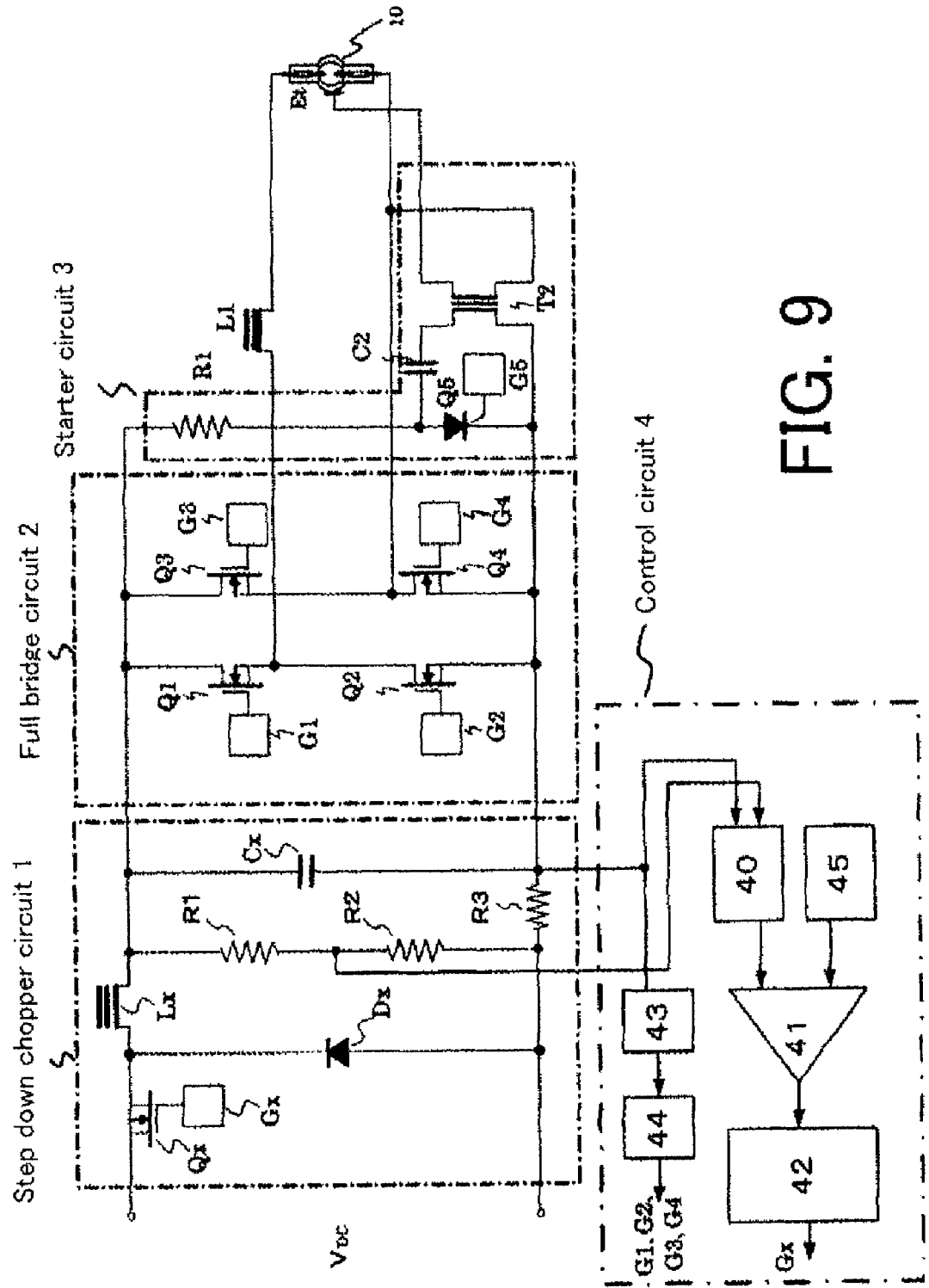
FIG. 9 shows a power supply apparatus of a high pressure discharge lamp lighting apparatus according to the present invention.

FIG. 9 shows an example of a power supply apparatus which turns on the discharge lamp. A lighting apparatus is made up of a discharge lamp 10 and a power supply apparatus. The power supply apparatus comprises a step down chopper circuit 1 to which direct current voltage is supplied, a full bridge type inverter circuit 2 (hereinafter referred to as a "full bridge circuit"), which is connected with an output side of the step down chopper circuit 1 and supplies alternating voltage to the discharge lamp 10 by converting the direct current voltage, a coil L1 which is in series connected to the discharge lamp, and a starter circuits 3. In addition, the step down chopper circuit 1, the full bridge circuit 2, the starter circuit 3, and a control circuit 4 form the power supply apparatus. The above mentioned units and a discharge lamp 10 are referred to as a lighting apparatus as a whole.

The step down chopper circuit 1 connects to a direct-current power source $V_{DC}$, and makes up of a switching element Qx, a diode Dx, a coil Lx, a smoothing capacitor Cx, and a drive circuit Gx for a switching element Qx. The switching element Qx is driven (turned on and off) by the drive circuit Gx. The duty ratio of the switching element Qx is adjusted by this drive, so that current or electric power supplied to the discharge lamp 10 is controlled. Resistors R1 and R2 for voltage detection and a resistor R3 for current detection are connected to a downstream side of the diode Dx and the coil Lx.

The full bridge circuit 2 is made up of switching elements Q1-Q4 which are transistors or FETs connected so as to form a bridge, and drive circuits G1-G4 of the switching elements Q1-Q4. In addition, although a diode may be connected in parallel to or in reverse parallel to each switching element Q1-Q4, these diodes are omitted in this embodiment. The switching elements Q1-Q4 are driven by the drive circuits G1-G4 through the control unit (not shown). In an operation of the full bridge circuit 2, turning on and off of the switching elements Q1 and Q4 and turning on and off of the switching elements Q2 and Q3 are repeated by turns. When the switching elements Q1 and Q4 are turned on, current flows through the step down chopper circuit 1→the switching element Q1→the coil L1→the discharge lamp 10→the switching-element Q4→the step down chopper circuit 1. On the other hand, when the switching elements Q2 and Q3 are turned on, alternating current in form of rectangle wave current is supplied to the discharge lamp 10 in a path of: the step down chopper circuit 1→the switching element Q3→the discharge lamp 10→the coil L1→the switching element Q2→the step down chopper circuit 1. When the switching elements Q1-Q4 are driven, in order not to simultaneously turn on all the switching elements Q1-Q4, a period (dead time Td) is provided so that all the switching elements Q1-Q4 are turned off at time of polarity change of the alternating current rectangle wave.

The starter circuit 3 is made up of a switching element Q5, a drive circuit G6, a resistor R4, a capacitor C2, and a transformer T2. At time of starting of the discharge lamp 10, by turning on the switching element Q5, energy stored in the capacitor C2 is impressed to the transformer T2 so as to raise the voltage, so that the high voltage is impressed to the lamp, thereby starting the lamp. In this embodiment, the so-called external trigger system is adopted, wherein a trigger for high-voltage impression is arranged on an outer surface of the discharge lamp 10.

The control circuit 4 is made up of an electric power processing unit 40, a comparator 41, a pulse width modulation circuit 42, a frequency setting circuit 43, a rectangle wave drive circuit 44, and a reference unit 45. A voltage signal detected by the resistors R1 and R2 and a current signal detected by the resistor R3 are converted into an electric power signal by the electric power processing unit 40, and the electric power signal is compared with the reference power value of the reference unit 45 at the comparator 41, so that the switching element Qx is controlled in a feed back manner, through the pulse width modulation circuit 42, whereby the so-called constant electric power control is performed, so that lighting electric power of the lamp is controlled so as to be a constant value. Moreover, the current signal detected by the resistor R3 is also transmitted to the frequency setting circuit 43. Here, the stationary frequency and the low frequency, corresponding to the lamp current are set up. A signal of the frequency setting circuit 43 is transmitted to the rectangle wave drive circuit 44, so as to control switching of the switching elements Q1, Q2, Q3, and Q4 of the full bridge circuit 2. Therefore, the low frequency is inserted into the stationary frequency by a switching operation of the switching elements Q1, Q2, Q3, and Q4, and timing thereof.

Reference values of the low frequency (5-200 Hz), the number of the waves inserted (one-ten units), and the insertion interval (0.01-120 seconds), are selected suitably, by taking into consideration, the design of the discharge lamp, especially the thermal design of the electrodes. The above-mentioned reference values mean values before the lamp electric power falls, i.e., values at rated power. For example, the rated power of the discharge lamp is 120 W, the stationary frequency is 180 Hz, the low frequency is 15 Hz, the number of waves inserted is two units (one cycle) and the insertion interval is one (1) second (lighting example 1). Moreover, when the rated power of the discharge lamp is 150 W, the stationary frequency is 200 Hz, the low frequency is 10 Hz, the number of waves inserted is two units (one cycle), and the insertion interval is 1 second (lighting example 2). Moreover, when the rated power of the discharge lamp is 300 W, the stationary frequency is 300 Hz, the low frequency is 7.5 Hz, the number of waves inserted is two units (one cycle), and the inserted interval is 0.5 seconds (lighting example 3). Moreover, when the rated power of the discharge lamp is 250 W, the stationary frequency is 400 Hz, the low frequency is 5 Hz, the number of waves inserted is two units (one cycle), and the insertion interval is 0.5 seconds (lighting example 4). Moreover, when the rated power of the discharge lamp is 135 W, the stationary frequency is 360 Hz, the low frequency is 45 Hz, the number of waves inserted is one unit (0.5 cycles), and the insertion interval 0.02 seconds (lighting example 5). Moreover, when the rated power of the discharge lamp is 135 W, the stationary frequency is 540 Hz, the low frequency is 180 Hz, the number of waves inserted is two units (one cycle), and the insertion interval is 0.02 seconds (lighting example 6)

The preceding description has been presented only to illustrate and describe exemplary embodiments of the present high pressure discharge lamp. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. A high pressure discharge lamp lighting apparatus for lighting a discharge lamp, comprising:
    a discharge container made of quartz glass that encloses 0.20 mg/mm$^3$ or more of mercury and halogen in a range of $10^{-6}$ μmol/mm$^3$-$10^{-2}$ μmol/mm$^3$;
    a pair of electrodes arranged in the discharge container, with a projection is formed at a tip of each of the electrodes, wherein the projections face each other at an interval of 2.0 mm or less; and
    a power supply apparatus which performs constant electric power control over the discharge lamp; the power supply apparatus supplies a first alternating current of stationary frequency selected from a range of 60-1000 Hz to the discharge lamp;
    wherein the power supply apparatus inserts a second alternating current of lower frequency, which is lower than the stationary frequency, periodically into the first alternating current;
    wherein, when a lighting current value of the discharge lamp is smaller than a predetermined lower limit, the lower frequency is set as a predetermined minimum frequency; when the lighting current value is larger than a predetermined maximum value, the lower frequency is set as a predetermined maximum frequency; and when the lighting current value is between the lower limit and the maximum value, the lower frequency is set as a first selected frequency corresponding to the lighting current value; wherein the first selected frequency increases based on an increase of change value as the lighting current value increases.

2. The high pressure discharge lamp lighting apparatus according to claim 1, wherein, when the lighting current value is smaller than the predetermined lower limit, the stationary frequency is set as predetermined minimum frequency; when the lighting current value is larger than the predetermined maximum value, the stationary frequency is set as predetermined maximum frequency; and when the lighting current value of a discharge lamp is between the lower limit and the maximum value, the stationary frequency is set as a second selected frequency corresponding to the lighting current value; wherein the second selected frequency increases based on the increase of change value as the lighting current value increases.

3. The high pressure discharge lamp lighting apparatus according to claim 1, wherein the lower frequency of the second alternating current changes stepwise according to the change of the lighting current value.

4. The high pressure discharge lamp lighting apparatus according to claim 1, wherein the power supply apparatus comprises a table that includes a relation between the lighting current value and the corresponding lower frequency for every rated power value of the discharge lamp.

5. The high pressure discharge lamp lighting apparatus according to claim 4, wherein data of the table changes with an accumulated lighting time of the discharge lamp.

6. The high pressure discharge lamp lighting apparatus according to claim 5, wherein the data of the table changes with the accumulated lighting time of the discharge lamp, so that the first selected frequency corresponding to the lighting current value becomes smaller than an initially set first selected frequency.

7. The high pressure discharge lamp lighting apparatus according to claim 4, wherein data of the table changes while a predetermined voltage change is detected during the discharge lamp's lighting.

8. The high pressure discharge lamp lighting apparatus according to claim 7, wherein the data of the table changes so that the first selected frequency corresponding to the lighting current value becomes smaller than an initially set lower frequency, while the predetermined voltage change is detected during the discharge lamp's lighting.

* * * * *